United States Patent
Eshraghi

[11] Patent Number: 6,004,691
[45] Date of Patent: Dec. 21, 1999

[54] FIBROUS BATTERY CELLS

[76] Inventor: Ray R. Eshraghi, 7815 Salem Dr., Hudson, Ohio 44236

[*] Notice: This patent issued on a continued prosecution application filed under 37 CFR 1.53(d), and is subject to the twenty year patent term provisions of 35 U.S.C. 154(a)(2).

[21] Appl. No.: 08/549,976

[22] Filed: Oct. 30, 1995

[51] Int. Cl.$^6$ .......................... H01M 10/14; H01M 2/18; H01M 4/74

[52] U.S. Cl. .......................... 429/133; 429/141; 429/145; 429/164; 429/235

[58] Field of Search ...................... 429/140, 141, 429/131, 136, 137, 94, 133

[56] References Cited

U.S. PATENT DOCUMENTS

| | | | |
|---|---|---|---|
| 2,747,007 | 5/1956 | Brandt | 429/141 |
| 2,896,006 | 7/1959 | Sundberg | 429/238 |
| 4,025,701 | 5/1977 | Sundberg | 429/140 |
| 4,042,436 | 8/1977 | Sundberg | 429/141 |
| 4,250,233 | 2/1981 | Jeanneret | 429/140 |
| 4,328,292 | 5/1982 | Remer | 429/140 |
| 4,522,897 | 6/1985 | Walsh | 429/127 |
| 5,134,045 | 7/1992 | Lanari | 429/141 |
| 5,492,782 | 2/1996 | Higley | 429/140 X |
| 5,518,836 | 5/1996 | McCullough | 429/94 |

*Primary Examiner*—Maria Nuzzolillo
*Assistant Examiner*—Mark Ruthkosky

[57] ABSTRACT

The subject invention relates to a battery cell structure fabricated from a single fiber containing an electrode or active material of an electrode, a membrane separator, the electrolyte, the active material of a second electrode or a second electrode. Further, the subject invention relates to a cell design fabricated from two single fibers in contact with each other, one containing an electrode, a membrane separator, electrolyte, and the other, a second electrode. The two electrodes here, represent the positive and negative electrodes of a cell. The invention further relates to the process of inserting one fibrous electrode inside a fibrous membrane separator or insulator and to the process of forming one fibrous cell which contains an electrode, porous insulator, the electrolyte, the active material of a second electrode or a second electrode.

11 Claims, 8 Drawing Sheets

Fibrous electrode

Hollow fiber membrane as an insulator or separator

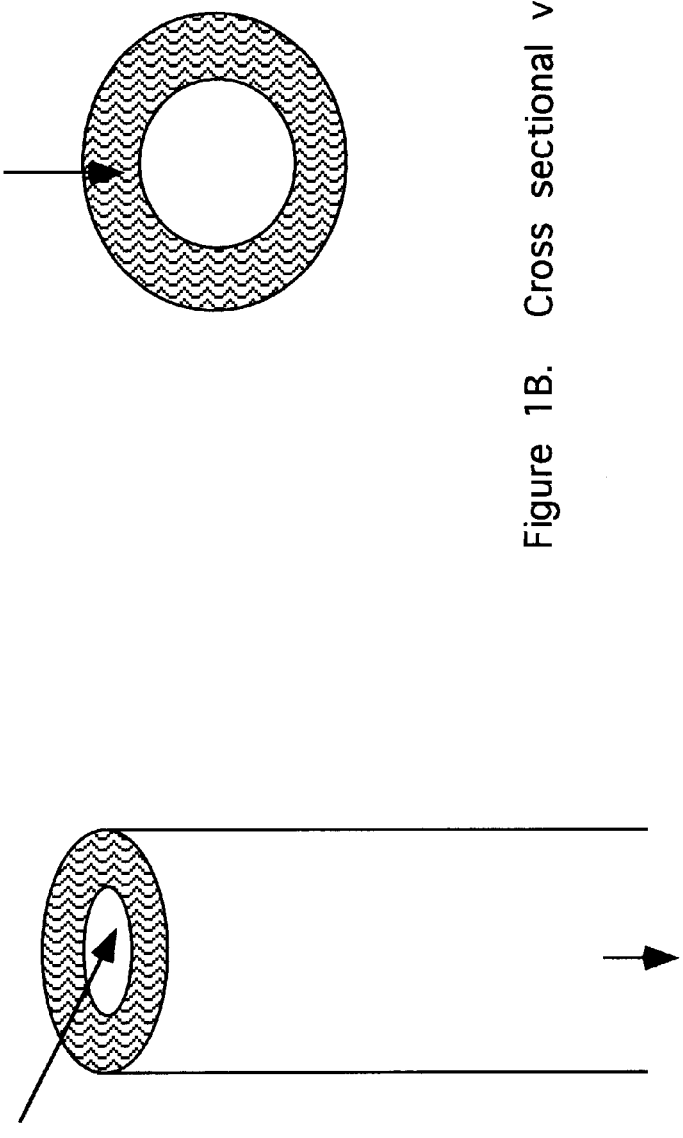
Figure 1B. Cross sectional view of hollow fibers
Figure 1A. Side view of a hollow fiber membrane

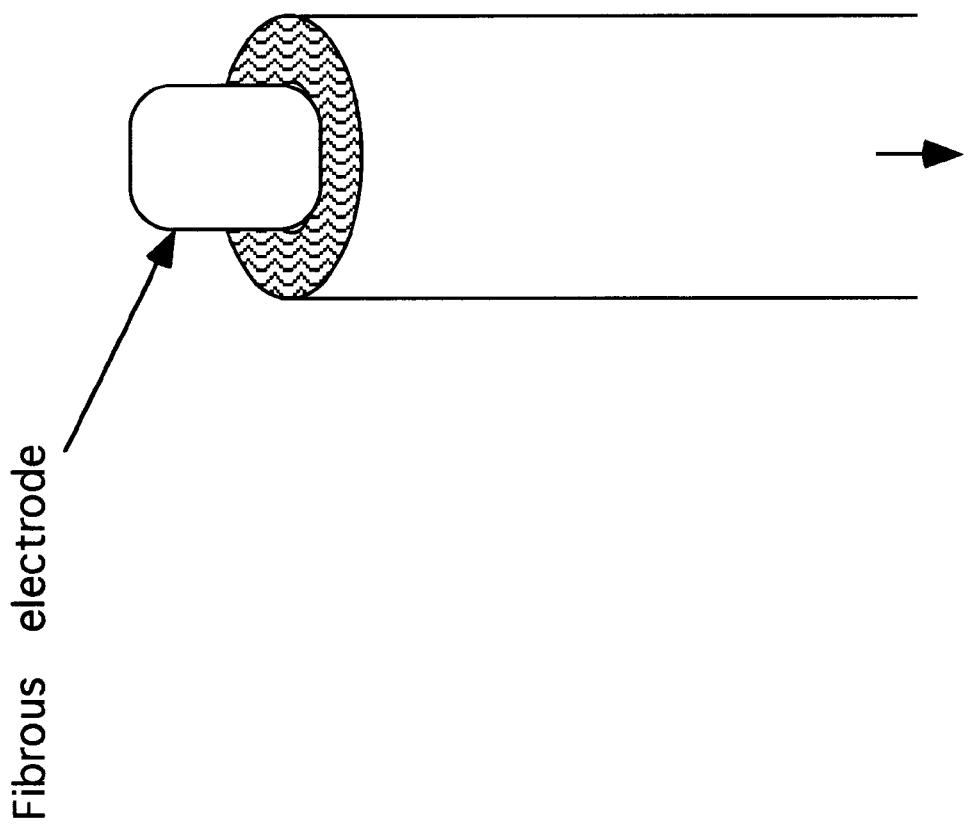
Figure 2 - Hollow fiber membrane as an insulator or separator

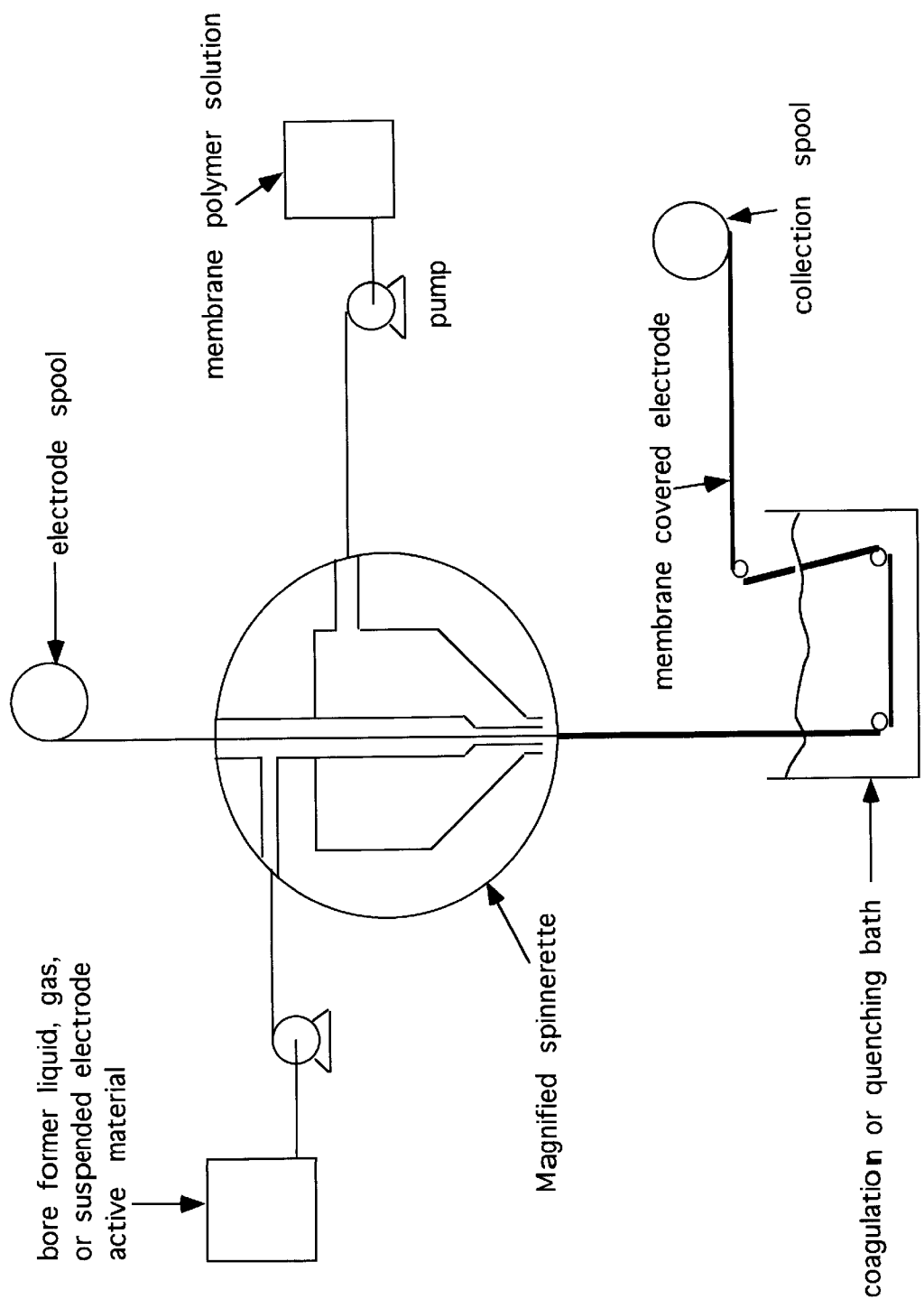
Figure 3 - Process flow diagram for encasing a fiber electrode with membrane separator

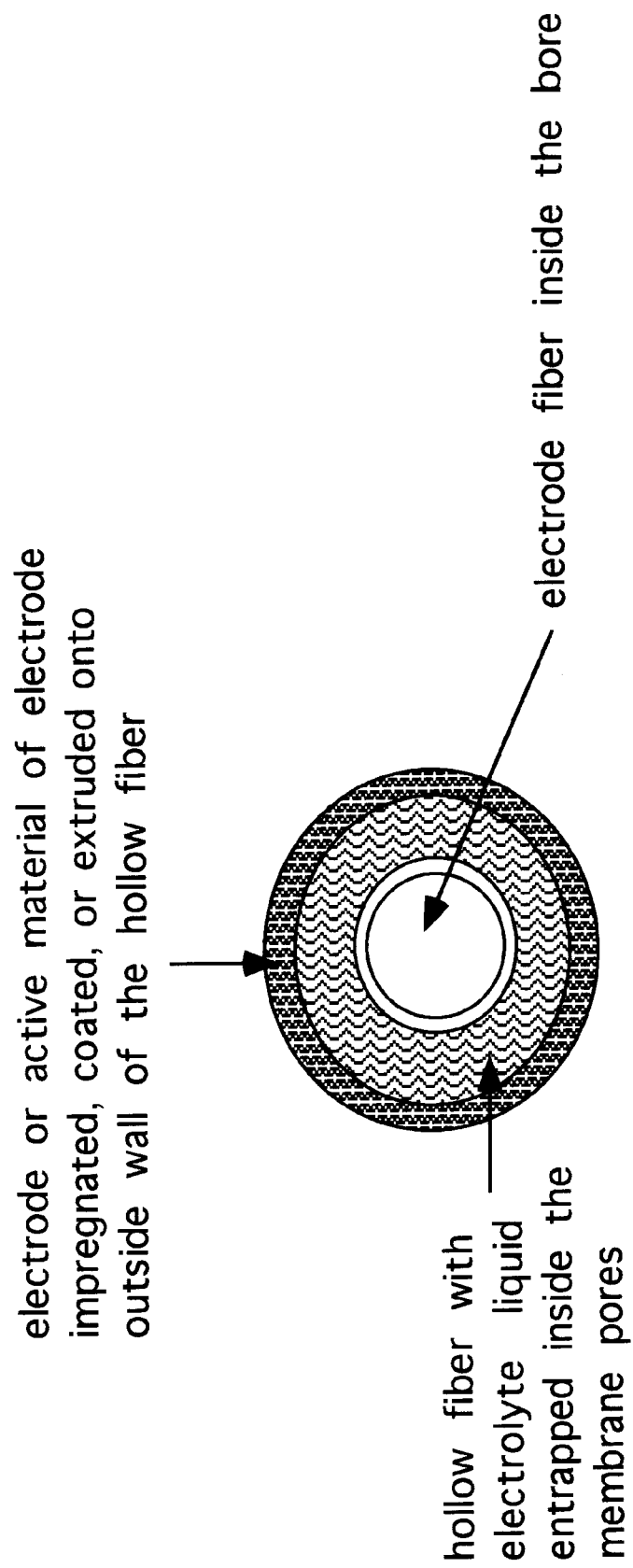
Figure 4 - Cross sectional view of a fiber cell

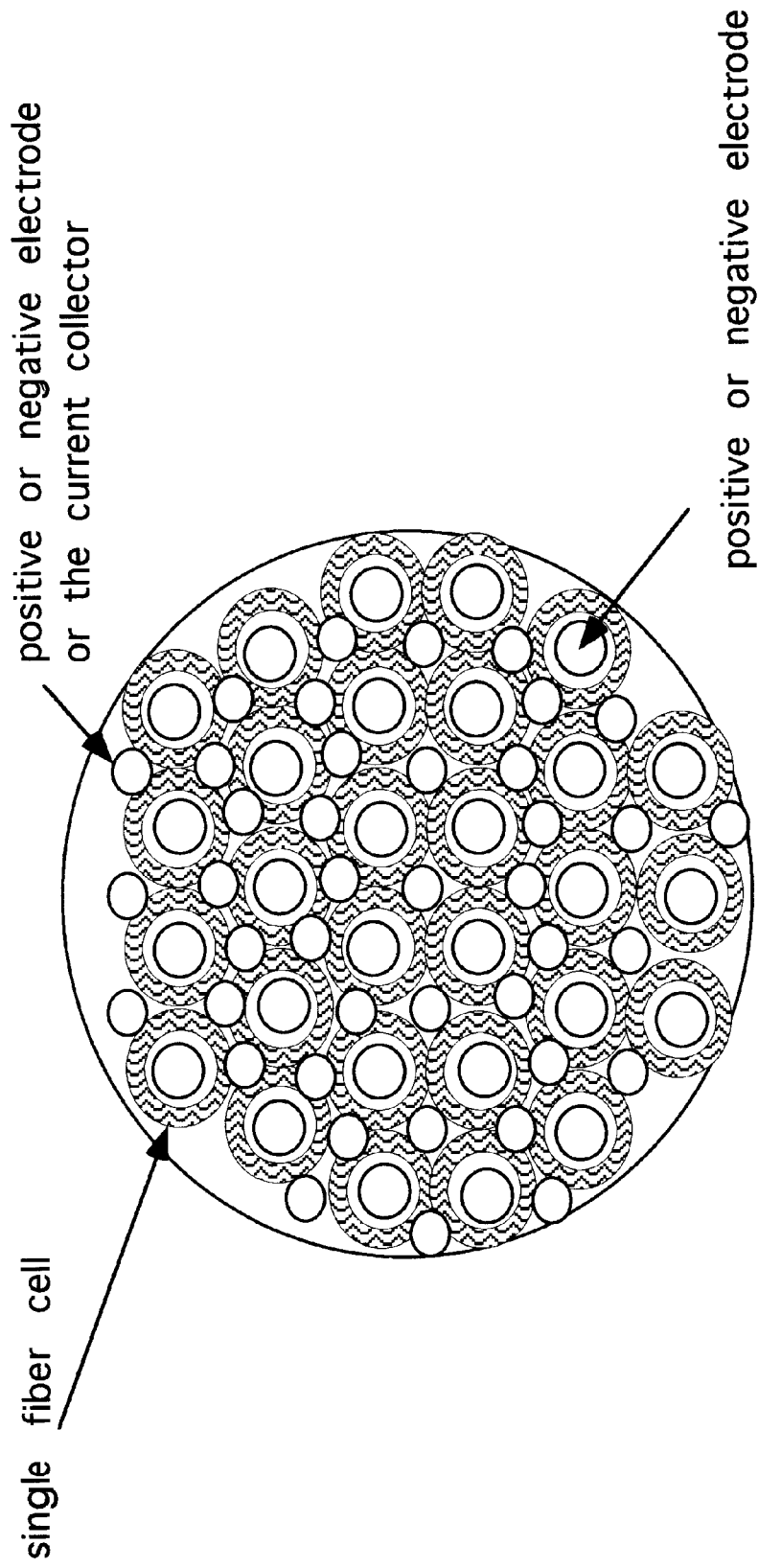
Figure 5 - Cross sectional veiw of the fiber cells packed in paralell with current collector fibers.

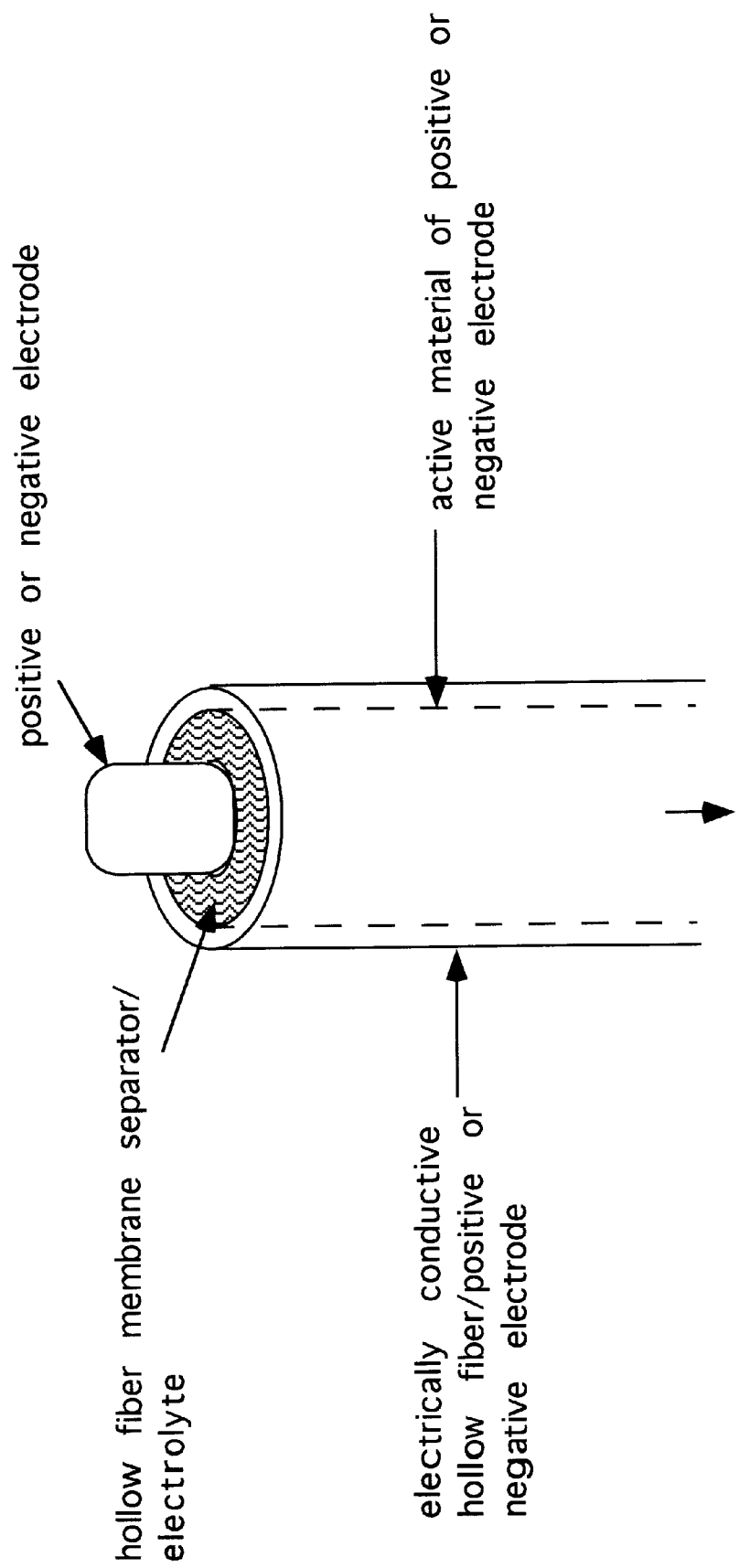
Figure 6 - Fiber cell inserted inside an electrically conductive hollow fiber

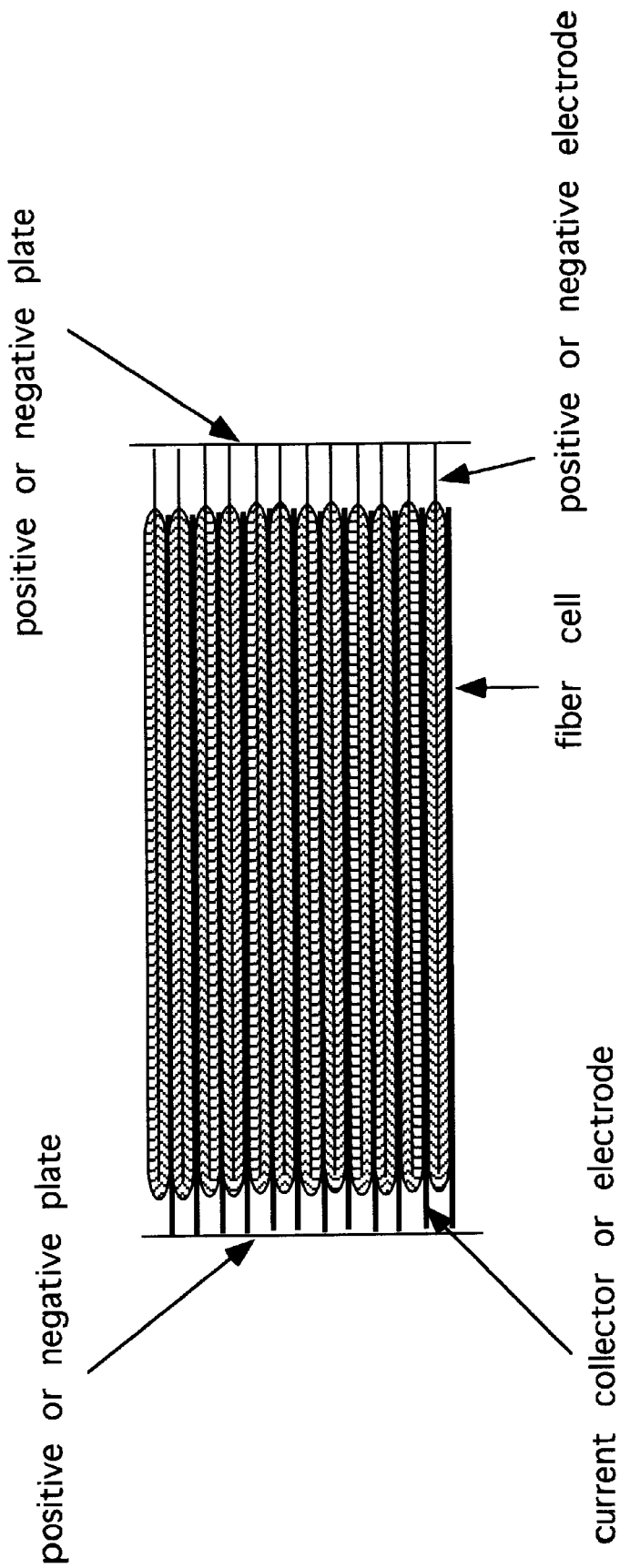
Figure 7 - side veiw of fiber cells and current collectors in parallel

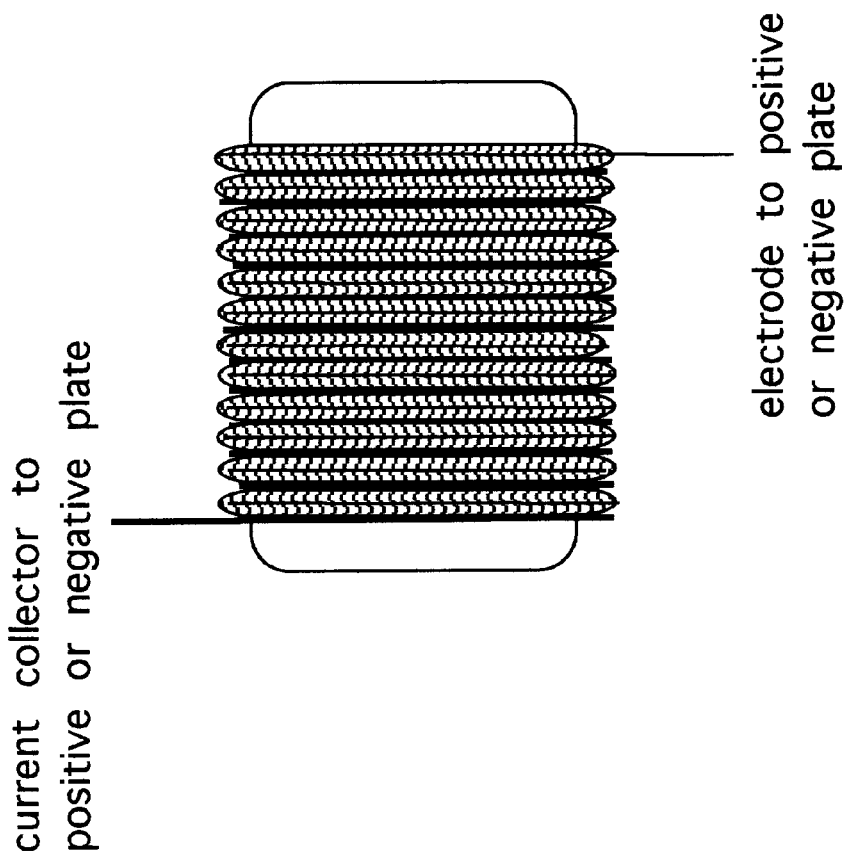
Figure 8 - Fiber cell and current collector wound in cylindrical configuration

FIBROUS BATTERY CELLS

This invention relates to design of a battery cell in which all the basic components of a cell such as the positive and negative electrodes, or the active material of the electrodes, the separator, and the electrolyte are fabricated into one or two single fibers. Specifically, the invention relates to a battery which is fabricated from densely packing multitude of these fibers into a module.

BACKGROUND OF THE INVENTION

The technology of fabricating and manufacturing primary or secondary battery cells has been around for many years. The electrochemistry and the principals of how rechargeable and non-rechargeable batteries work have been thoroughly and exhaustively reported in many books and publications. Similarly the material of construction for the electrodes, separator, type of electrolyte, and the cell design parameters for the currently available commercial batteries have been thoroughly investigated. In general, a battery cell consists of two electrodes, positive and negative, a separator to avoid internal short circuiting, and electrolyte, typically in liquid or gel form. The chemical reaction at the electrodes is the source of electron generation that can be transferred from one electrode to the other through an external circuit. In rechargeable batteries, this electrochemical reaction is reversible. i.e., with an external electron source such as a charger, the active material of the electrodes can be reclaimed. Typical rechargeable battery designs are given in "Rechargeable Batteries Application Handbook ", EDN series, 1992. An extensive review of battery cell technology can be found in Kirk-Othmer Encyclopedia Of Chemical Technology, Wiley. New York.

Commercially available battery cells contain electrode plates on which the active material of the electrodes are deposited. Many different methods of depositing the active material on the electrode plates have been utilized. These methods consist of simple impregnation on a porous substrate, electrochemical plating, sputtering, and many other form of coating techniques. The substrates chosen for depositing the active material, usually have high surface area, such as highly porous surfaces, polymeric foams with open structure, fiber mats, etc. The high surface area of the substrate results in availability of more active sites on each electrode that participates in the electrochemical reaction and generation of electrons, hence increasing the cell capacity. The active material used in construction of the positive and negative electrodes consist of but not limited to nickel, nickel oxy- hydroxide, cadmium, lead, lead oxide, silver, mercury, zinc, oxygen, hydrogen, graphite, nickel-lanthanum alloys, etc. in crystalline or amorphous form. If the substrate is not electrically conductive, it may in turn be deposited or attached to an electrically conductive material typically referred to as current collector. For the purpose of clarity the combination of the active material, the substrate, and the current collector is referred to as the electrode from here thereafter. In commercially available battery cells, the electrode plates are electrically isolated from each other by another plate of a porous material so that an internal short-circuit does not occur. The separator used is typically a porous polymeric material with good wetting characteristics or of the glass fiber type. The media between the two electrodes is filled with an electrolyte solution such as sodium or potassium hydroxide, sulfuric acid or other alkaline and acid solutions. The porous structure of the separator allows for ion transfer between the positive and negative electrode and free diffusion of gases generated at the electrodes. In design of certain sealed rechargeable battery cells, the capacity of the active material of one electrode must be controlled such that full charge is achieved preferentially on one electrode before the other, in order to avoid evolution of excessive gases. Also, the amount of electrolyte used is only enough to wet the surface of the two electrode plates as a thin film and fill the pores of the porous separator material.

The purpose of the separator plate between the two electrodes in a battery cell is to allow minimal space between the two electrodes and hence maximize the amount or the surface area of the electrode that can be packed into a battery container of certain size. In certain commercially available batteries, the electrode plates are fabricated into strip of flat plates which along with a strip of separator material are wound together into a roll configuration and inserted into a container.

It is an object of the present invention to provide a structure for the configuration of the two electrodes and the separator such that a single fiber or two fibers in contact with each other will make up a single cell or micro-cell. The geometry of the cells of this invention provide an extremely high surface area of the electrodes per unit volume when numerous fibrous cells are packed into a given container size. The extremely high surface area of the electrodes exposed to the electrochemical reaction translates into extremely high energy density per volume.

It is a further object of this invention to provide a process for inserting a fibrous electrode inside a porous insulator or forming a thin layer of a separator material with porous structure around a fibrous electrode.

SUMMARY OF THE INVENTION

The subject invention relates to a cell structure in which a single fiber containing an electrode or active material of an electrode, the separator, the electrolyte, the active material of a second electrode or a second electrode will comprise a single cell. Further, the subject invention relates to a cell design where a cell is fabricated from two single fibers in contact with each other, one containing an electrode or active material of an electrode, the separator, the electrolyte, and the other, a second electrode. The two electrodes here, represent the positive and negative electrodes of a cell.

The outside diameter of the cell fibers can range from less than 100 microns to over a few millimeters. The length of the fiber constitutes the cell capacity and may vary depending on the design or cell current and voltage requirement.

In the cell structure of this invention, one electrode in fibrous form or as a thin gauge wire with the size ranging from less than 100 microns to over a few millimeters, (or active material of an electrode) is covered by a membrane separator material preferably polymeric, as a coating on the electrode. This forms a new fiber comprised of a thin gauge fiber electrode and a polymeric membrane insulator. The polymeric insulator has a porous, open structure which would allow liquid or gas transfer from one side to the other and can retain the electrolyte liquid in the cavity of its porous structure. If a second electrode or the active material of a second electrode is impregnated or coated on the outside pores of the insulator or separator, a single fibrous cell is formed, the capacity of which is proportional to the length of the fiber. A single, electrically conductive fiber of approximately the same size may have to be placed, to contact the fiber cell as the current collector of the second electrode if the active material of the second electrode is not electrically conductive. If the material that comprise the entire second electrode, i.e. the active material and the current collector material, is impregnated or coated on the outside pores of the separator wall, the separate current collector fiber is not required.

Alternatively, if the second electrode or active material of the second electrode is not impregnated or coated on the outside of the porous insulator, a second fibrous electrode will have to be placed adjacent and in contact with the insulated fiber. In this configuration, the membrane insulated electrode fiber, the second electrode, and the electrolyte trapped in the walls of the porous insulator constitutes a fiber cell composed of two fibers.

The subject invention also relates to a battery design in which, the fiber cell is wound into different shapes and sizes, or multitude of the fiber cells are densely packed in parallel into a container.

The invention further relates to the process of inserting one fibrous electrode inside a fibrous separator or insulator and to the process of fabricating one single fiber by forming a thin layer of a separator material with porous structure around a fibrous electrode by various means of manufacturing techniques such as fiber spinning, dip coating, etc.

BRIEF DESCRIPTION OF THE DRAWINGS

FIGS. 1A and 1B depict side and cross sectional view of a hollow fiber membrane 1, the bore of the hollow fiber 2, and the porous wall of the membrane 3.

FIG. 2 shows the hollow fiber membrane 1 as insulator or separator for fibrous electrode 4 inside its bore.

FIG. 3 displays a process flow diagram for encasing a fiber electrode with a membrane separator.

FIG. 4 shows cross sectional view of a fiber cell 5 containing an electrode fiber 4 inside the bore, membrane wall 3 with liquid electrolyte entrapped inside the membrane pores, a second electrode or active material of a second electrode 6 impregnated, or coated, or extruded onto the outside wall of the hollow fiber.

FIG. 5 displays cross sectional view of the fiber cells 5 packed in paralell with current collectors 7(or second electrode 6) inside battery casing 8.

FIG. 6 depicts fiber cell 5 inserted inside an electrically conductive hollow fiber 9.

FIG. 7 shows side view of fiber cells 5 and current collectors 7 (or second electrode 6) in parallel. The electrodes 4 and the current collectors 7 are attached to plates 10 and 11 to form the positive and negative plates.

FIG. 8 displays fiber cells 5 and current collectors 7 (or second electrode 6) wound in cylindrical configuration. The electrodes 4 and 6 (or current collector 7) are attached to positive and negative plates 10 and 11.

DETAILED DESCRIPTION OF THE INVENTION

This invention relates to design and construction of a battery cell in fibrous form. The fiber cells can then be packed into containers of various sizes, with an extremely high energy density per unit volume. The high energy density is the result of extremely high electrode surface area provided by the fibrous geometry. The cell and the battery design of this invention can utilize the currently commercial material of construction for the positive and negative electrodes, separator, electrolyte, and other materials used for packaging the batteries.

The cell structure of the present invention is clearly different from other designs in which fiber mats have been used as substrate in forming the electrodes. In the designs where fiber mats are used as electrodes, the three components of the cell, the negative and positive electrodes, and the insulator are separate from each other and typically configured in plate or flat strips. In that design the electrodes are in flat plates of various geometries which may contain many fibers similar to fiber glass insulation. In the design of this invention, a single, or two single fibers contain the electrodes, the separator, and the electrolyte, i.e. all of the components that comprise the entire cell or micro-cell.

In the design of the cell of this invention, the insulator or separator without an electrode inserted inside of it, resembles a hollow fiber membrane. FIG. 1A, and 1B shows the side view and cross section of a hollow fiber membrane. Hollow fiber membranes are extremely small tubes with an inside or outside diameter of less than 100 micron to a few millimeter. The walls of the hollow fiber membranes are porous with pores ranging from a few angstroms to a few microns depending on the type of membranes. Based on the size of wall pores, hollow fiber membranes are classified as micro filtration, ultra filtration, reverse osmosis, etc. The porous, open structure walls of the hollow fibers allow free transfer of liquids or gases from the outside or shell side of the fiber to the inside or the bore side of the fiber. Hollow fiber membranes can be fabricated from variety of polymeric material such as polypropylene, polysulfone, regenerated cellulose acetate to name a few and from other materials such as glass and ceramics. Polymeric hollow fibers are typically fabricated by variety of wet or dry spinning techniques. The fabrication of various types of hollow fiber membranes has been covered extensively in open literature and is well documented. The hollow fiber membranes and the method of fabricating same are not the subject of this invention. However, if a thin electrode fiber (or the active material of an electrode) is placed inside the bore of a hollow fiber, the membrane can then be used as an insulator for the electrode while allowing free diffusion of liquids and gases from and to the electrode. FIG. 2 shows the configuration of a hollow fiber with an electrode fiber inside the bore. This configuration is the building block of a fiber cell.

Many different techniques can be used to form a thin layer of an insulator or separator material with porous, open structure around a fibrous electrode or substrate. One preferred method is to imbed the fibrous electrode inside the bore of a hollow fiber membrane directly, during the membrane fabrication or spinning process. Hollow fiber membranes are typically fabricated by extruding the membrane material or formulation through an orifice on the extrusion mold referred to as "spinnerette". A liquid or gas is blown through a bore-forming tube, located in the center of the extrusion orifice, as an internal coagulant or quenching media. During the spinning process, the membrane material is extruded through the orifice opening and around the bore-former tube. The circumference of the bore-former tube forms the inside diameter of the hollow fiber. Examples of more detailed description of hollow fiber membrane fabrication can be found in the journal of Separation Since and Technology, 27(2), pp. 161–172, 1992, and under the reference; I.Cabasso, "Hollow Fiber Membranes", in Kirk-Othmer Encyclopedia Of Chemical Technology (M. Grayson and D. Eckroth,eds), Wiley. New York, 1980, p.492. During the fiber spinning process, a string of fibrous electrode is pulled from an external source through the bore-former tube of the spinnerette simultaneously as the membrane material is extruded through the orifice. The hollow fiber membrane structure is formed around the fibrous electrode as the coated fiber is pulled through a quenching media such as a solvent or a gas. Another method to form a thin layer of a porous separator material around a fibrous electrode or substrate is the conventional dip or spray coating of the fiber, using the polymer formulations that is used to fabricate the membranes followed by inserting into a quenching media similar to wet spinning. Using this technique, a thin layer of the insulator material is coated on the fibrous electrode followed by the solidification and formation of the porous structure in the quenching media or the coagulation bath. The two process examples given here are to illustrate how a layer of porous insulator can be formed around a fibrous electrode. Other processes similar to the conventional processes used for insulating electrical wires, plasma or vapor deposition or polymerization, etc. may also be used with the exception that the separator material used can be transformed into a porous, permeable structure if the coating technique used does not produce an open or porous structure. A non porous insulator can be transformed into a porous, membrane like structure by other techniques such as leaching, or punching sub micron holes into the material using lasers. The electrode fibers may also be physically threaded inside the bore of a hollow fiber membrane depending on the size or length of the fiber using vacuum or other techniques.

The porous hollow fiber membrane will, in effect, perform the same function as the flat sheet separators in conventional rechargeable and non-rechargeable batteries. That is, isolate the electrodes, entrap electrolyte liquid, and allow free transport of ions and gases from one electrode to the other. The active material of the second electrode or the entire material of a second electrode can be impregnated or coated onto the pores of the outside walls or the shell side of the hollow fiber as shown in FIG. 3. In this configuration a single hollow-fiber membrane containing a fiber electrode, electrolyte liquid in the wall pores, active material of the second electrode or the entire second electrode, comprise a single cell. For the sake of clarity this will be referred to as "fiber cell" from here thereafter. The electrochemical reaction and ion transport from one electrode to the other takes place inside the porous wall of the hollow fiber membrane that may have a thickness of a few microns to a few hundred microns. Electrically conductive current collectors which are also in fibrous form can be placed alongside and parallel to the fiber cell to collect current from the active material of the second electrode impregnated onto the outside of the fiber cell, if the active material of the electrode is not electrically conductive. FIG. 4 shows the configuration of a fiber cell and a current collector. When the fiber cells are wound or packed in parallel, each current collector comes in contact with the outside walls of the other fiber cells in its surrounding. If the active material of an electrode is sufficiently electrically conductive, intermittent placement of the current collectors near the fiber cells may not be required. In that case, the current collectors may be placed less frequently or placed in contact with the active material of the electrode outside the fiber bundle. If the material that comprise the entire second electrode, i.e. the active material and the current collector material, is impregnated or coated on the outside pores of the separator wall, the separate current collector fiber is not required.

Alternatively, if the active material of the second electrode is not impregnated or coated onto the outside wall of the hollow fiber membrane, it can be impregnated or coated on a fibrous current collector forming a second electrode. Similar to the configuration shown in FIG. 4, the second electrode will lie in contact or parallel to the hollow fiber membrane and the first electrode assembly. In these configuration the first and the second electrode could be either negative or positive electrodes.

Another method for fabricating the fiber cell of this invention is to insert the hollow fiber assembly with the electrode inside its bore, yet inside another electrically conductive hollow fiber. In this case the active material of the second electrode can be either impregnated onto the outside wall of the inner hollow fiber or the inside wall of the electrically conductive, outer fiber. FIG. 5 shows the configuration of the single cell.

The cell design of the present invention is particularly suitable for the cases where the active material of the electrodes are in gaseous form such as in fuel cell applications. The hollow fiber membrane separators, depending on the inside and outside diameter, can tolerate extremely high pressures and retain the electrolyte in its pores. If the active material of the electrodes are in gaseous form such as oxygen and hydrogen the hollow fiber separator must be first sealed in a container similar to high pressure hollow fiber membrane modules before the gases are introduced on either side of the separator.

The fiber cells of the present invention can be packed into containers of various sizes in parallel or series in order to make batteries of different voltage and current for various applications. one method for packing the fiber cells into a battery is placing fiber cells (with or without the second fiber electrode or current collector) of approximately equal length in parallel. FIG. 6 shows the configuration of the fiber cells with the current collectors (or second electrode) in parallel. The ends of the electrodes are then attached to the positive or negative plates.

Another method of packing the battery container would be to wind a strand of the fiber cell (with or without the second fiber electrode or current collector) into a cylindrical shape. The electrodes are then attached to the positive or negative plates of the battery. This configuration is shown in FIG. 7. The capacity of the battery cell would then depend on the length of the fiber cell used. The fiber cells can be wound in many different shapes and sizes depending on the requirement for the battery construction. The cylindrical configuration given here is an example of how the fiber cells can be fabricated into batteries of various capacities. The applications of the two design examples given here depends on whether high voltage or high current is required from the battery. A small amount of electrolyte in addition to the portion that exists inside the fiber wall may have to be added to the packaged cells to fill the cavities unfilled by the fibers.

The materials of construction currently used in fabricating the conventional, commercial batteries can be used in the fiber cell and battery design of this invention. The electrodes can be any of the conventional or unconventional materials used in rechargeable and non rechargeable batteries such as nickel, nickel hydroxide, cadmium, lead, lead oxide, mercury, silver, zinc, metal hydrides, various nickel alloys, graphite, oxygen, hydrogen and many more. The electrode fiber can be, either entirely composed of the active material of the electrode or impregnated or coated on an electrically conductive fibrous substrate with the active material of an electrode. The method of impregnation of the active material of an electrode on an electrically conductive fibrous substrate, can be any of the methods currently known in open art literature. The method of impregnation of the outside wall of the hollow fiber may require any of the in-situ techniques used in preparation of the active material of an electrode. The active material of an electrode could be in gas, liquid, solid, or gel form impregnated, absorbed or adsorbed on the substrate or the hollow fiber. Any electrically conductive material can be used as current collector, as long as it meets the demands of the cell conditions for corrosion, longevity, cost and etc. The electrically conductive material can be used as a separate fiber or coated on the outside wall of the hollow fiber.

The choice of the material of construction for the hollow fiber membrane may depend on the type and application of the battery. Polymeric material such as polypropylene, polysulfone, polyethylene, regenerated cellulose acetate, and any other polymers currently used in fabricating hollow fiber membranes including glass and ceramics can be used to fabricate the separator. It is important to choose a material that is compatible with the electrolyte used, i.e., the electrolyte would not deteriorate the hollow fiber separator. Hollow fiber membranes of various pore sizes can be used as the separator material. Hollow fiber membranes such as micro-filtration membrane with large pores may be more suitable because of lower resistance to diffusion of ions and gases. In some instances where control over discharge rate is required, a smaller pore hollow fiber membrane may be more suitable. In any case, the thickness of the membrane wall would dictate a portion of the internal resistance in the cell.

A design similar to current sealed cell batteries can be used in packaging the fiber cells of this invention into a rechargeable or sealed cell battery with the required pressure venting mechanism. For fuel cell applications, a module design similar to high pressure gas separation hollow fiber modules can be employed.

The batteries fabricated from the fiber cells of this invention can be used in many non rechargeable or rechargeable applications such as household items, electronic equipment, toys, etc. The high energy density per unit volume generated by the batteries of the current invention makes it particularly suitable for electric automobile, and space applications.

EXAMPLES

The following examples demonstrate the extremely high electrode surface area that can be packed into a given volume using the fiber cell geometry of this invention. The high electrode surface area translates into high voltage or current density per unit volume.

Example 1

Calculate the electrode surface area that can be packed into a battery container 1 cm in diameter, and 5 cm long using fiber cells of this invention with an outside diameter of 500 micrometer placed in parallel as shown in FIG. 6. The diameter of the second electrode or the current collector of the second electrode is chosen such that it falls inside the interstitial space created by four or less fiber cells as shown in FIG. 4.

Cross sectional area of the battery=$\pi \times (1)^2/4$=0.7853 cm2

Cross sectional area of one fiber cell=$\pi \times (0.05)^2/4$=0.00196 cm2

Minimum or effective surface area of the battery cross section utilized by the fibers=78% of the total surface area=0.78×0.7853=0.6123 cm2

Number of fibers that can be packed in the effective cross sectional area of the battery=0.6123/0.00196=312

The outside or shell surface area of a fiber cell 5 cm long=$\pi \times 0.05 \times 5$=0.7853 cm2

Theoretical surface area of the 312 fiber cells packed in the battery=312×0.7853=245 cm2

Assuming a minimum of 75% packing efficiency;

The practical surface area of the electrode packed in the battery=0.75×245=183.75 cm2

This surface area is significantly higher than the surface area that can be achieved in rolling strips of flat electrode and separator plates inside similar size battery can. This equates to a surface area to volume ratio of 46.8 cm2/cm3.

Example 2

Using the same parameters for the battery size used in example 1, calculate the electrode surface area of the battery using fiber cells with an outside diameter of 250 micrometer.

Using the above procedure the minimum electrode surface area is calculated to be 367.5 cm2. This equates to a surface area to volume ratio of 93.6 cm2/cm3.

What is claimed is:

1. A cell assembly comprising:

a hollow, fibrous, membrane separator having an outer diameter in the range of about 100 $\mu$m to about 5 mm where the length of the fiber is longer than the fiber diameter, said membrane separator comprising pores and being selected from the group consisting of microfiltration, ultrafiltration and reverse osmosis membranes;

an inner, electrically conductive, fibrous, positive or negative electrode, including an active material, located within the hollow inner periphery of said hollow separator, where the length of the electrode is longer than the electrode diameter;

an electrolyte disposed in said pores of the membrane separator; and an outer positive or negative electrode comprising a layer of electrically conductive material and an electrode active material in contact with said membrane separator, wherein said outer electrode comprises:

a coating of electrode active material and electrically conductive material surrounding or impregnating said membrane separator, or an electrically conductive single fiber covered or in contact with a positive or negative electroactive material surrounding said membrane separator.

2. A cell assembly according to claim 1, wherein said membrane separator surrounding said inner electrode comprises a layer that is thin as compared to said membrane diameter.

3. A cell assembly according to claim 1, wherein one said electrode is in the fibrous form having an outside diameter of about 100 $\mu$m to about 1000 $\mu$m.

4. A cell assembly according to claim 1, wherein said cell has a fibrous geometry having an outside diameter of about 500 $\mu$m.

5. A cell assembly according to claim 1, wherein said cell has a fibrous geometry having an outside diameter of about 250 $\mu$m.

6. A cell assembly according to claim 1, wherein said membrane separator comprises a porous material or a non-porous material which can be transformed into a porous material; said material surrounding a fibrous, cylindrical inner electrode.

7. A cell assembly according to claim 1, wherein said electrodes are fabricated from said electrode active material, or are impregnated, coated, or extruded with said electrode active material on said electrically conductive substrate.

8. A cell assembly according to claim 1, wherein a layer of material consisting essentially of an electrically conductive material is impregnated, coated, or extruded with said electrode active material on the outside wall or inside bore of said separator.

9. A battery comprising said cell assembly according to claim 1.

10. A battery comprising a plurality of cells assembled according to claim 1, wherein said cells are wound in a cylindrical shape electrically connecting the exposed cathodes and anodes to plates forming positive and negative terminals and seal packaging said cells with or without a pressured vented encasement.

11. A battery comprising a plurality of cells assembled according to claim 10, wherein said diameter is about 1 cm.

* * * * *